United States Patent [19]

Youngquist

[11] Patent Number: 5,747,805
[45] Date of Patent: May 5, 1998

[54] FULLY INTEGRATING RESISTIVE ARRAY ELECTRONIC MULTIPLEXOR

[75] Inventor: Robert C. Youngquist, Cocoa, Fla.

[73] Assignee: New England Photoconductor Corp., Norton, Mass.

[21] Appl. No.: 630,276

[22] Filed: Apr. 10, 1996

[51] Int. Cl.⁶ ................................ H01L 31/09
[52] U.S. Cl. ............................................ 250/338.4
[58] Field of Search ........................................ 250/338.4

[56] References Cited

U.S. PATENT DOCUMENTS

| | | | |
|---|---|---|---|
| 4,403,148 | 9/1983 | Coon et al. | 250/332 |
| 4,780,612 | 10/1988 | Klatt | 250/336.1 |
| 5,126,552 | 6/1992 | Hayes, Jr. | 250/208.4 |
| 5,185,519 | 2/1993 | Hayes, Jr. | 250/208.1 |
| 5,442,176 | 8/1995 | Eckel, Jr. et al. | 250/338.4 |
| 5,489,776 | 2/1996 | Lung | 250/332 |

Primary Examiner—Constantine Hannaher
Attorney, Agent, or Firm—Cooper & Dunham LLP

[57] ABSTRACT

A sensor circuit and method for detecting the current output by one or more resistive detectors by connecting a respective integrating capacitor and a respective switch connected to each detector. Each detector charges the respective integrating capacitor until the switch allows the stored charge in the integrating capacitor to be transferred to the feedback capacitor of a shared operational amplifier which converts the stored charge to a voltage. In this way, current, not voltage is multiplexed and each sensor can be operated, that is, collect charge, virtually all the time. Thus, fewer components are required to monitor a large number of resistive detectors with little or no degradation in the signal to noise ratio.

18 Claims, 4 Drawing Sheets

FULLY INTEGRATING RESISTIVE ARRAY ELECTRONIC MULTIPLEXOR

FIELD OF THE INVENTION

This invention relates to an electronic multiplexing approach suitable for use by commercial industry in monitoring large numbers of resistive detectors and, in particular, for use in monitoring arrays of photoresistive infrared detectors.

BACKGROUND OF THE INVENTION

Various detecting elements have been developed which change resistance when exposed to a physical parameter. Some examples of these detecting elements include: (1) thermistors which change resistance with temperature; (2) photoresistive detectors which change resistance when illuminated with optical or infrared radiation of a suitable wavelength; and (3) solid state tin oxide gas detectors which change resistance in the presence of specified trace gases.

A wide variety of sensor circuits have been developed to accurately monitor the resistance of these detectors by producing an output signal which indicates the presence or amount of the physical parameter under observation. Many of these circuits achieve optimal signal to noise performance and are well known.

Among the types of photoresistive detectors are lead sulfide (PbS) and lead selenide (PbSe). Such detectors are used to detect infrared radiation and typically exhibit high resistance in the range of 1 to 20 megaohms. Lead sulfide is sensitive to radiation having wavelengths of 1 to 3 micrometers while lead selenide is sensitive to radiation having wavelengths in the range of 2 to 5 micrometers. Both detectors operate at room temperature and are used in fire alarms, water detectors, $CO_2$ detectors and other applications.

Some of the newer applications, for example infrared cameras and infrared spectrometers, require a large number of lead sulfide or lead selenide detectors configured as an array. One of these arrays has 64 linearly aligned detectors. Monitoring such large numbers of detectors requires circuitry which can detect the many changing resistances in a rapid and simple manner. Furthermore, the circuitry should not degrade the signal to noise ratio any more than the signal to noise ratio of a single detector circuit.

Multiplexing highly resistive devices efficiently and quickly presents unusual difficulties for a circuit designer for at least two reasons: (1) speed/performance; and (2) noise.

The high resistance of the detectors coupled with parasitic capacitances results in significant system degradation in both speed and performance when the detectors are operated in a standard voltage multiplexed manner, that is, when each sensor is interrogated sequentially. Because several milliseconds are required for enough current to flow across each of the detectors being interrogated to be significant, that is, accurately indicate the physical parameter, such a multiplexor operates too slowly for most applications.

To reduce most of the primary noise sources in high resistance detectors, the signal from each detector is integrated for a relatively long time period because over a substantial time period, the noise signals tend to average to zero. This technique, however, directly conflicts with the need to rapidly measure all the signals from a potentially large number of resistive detectors.

FIG. 1 illustrates a typical circuit which addresses some of these difficulties by amplifying and processing the signal from each detector individually. In FIG. 1, each sensor circuit 10 includes: a detector 12; a capacitor 14 to remove any direct current (DC) components; and an integrator/amplifier formed from an operational amplifier 22, a capacitor 24 and a resistor 26; and various biasing resistors 16, 18, 20. The outputs 28 of the sensor circuits are a set of voltage signals which, if desired, can be combined using standard multiplexing techniques. U.S. Pat. No. 4,403,148 which relates to an electro-optical scanning and display system mentions this technique.

FIG. 2 illustrates another typical sensor circuit 40 which also amplifies and integrates each detector's output individually. Specifically, the output of each detector 42 is connected to a respective series of amplifying elements 44. The output from each chain of amplifying elements 44 is connected to an integrator formed from a resistor 46 and a capacitor 48. To ascertain the amount of stored charge on the capacitor 48, switch 52 is closed. The amount of stored charge is then read through line 54. The capacitor 48 is discharged to reset for a new reading by closing switch 50.

More complete descriptions of such sensor circuits are found in the commercial literature supplied by such companies as Optoelectronics and Graseby Infrared. One typical device from Graseby Infrared operates by repetitively:

(1) integrating the current flows through all the resistive detectors allowing each detector to charge an integrating capacitor;

(2) halting the integration after a predetermined time period to transfer the charge from the integrating capacitor to a holding capacitor;

(3) producing a serial data stream by buffering the held voltage with amplifiers so that a standard voltage multiplexing system can read each signal and generate a data stream; and (4) discharging the integrating capacitors.

The Graseby Infrared approach solves the two difficulties discussed above, that is: (1) the voltage produced by each sensor is buffered by an amplifier to produce the current required by the multiplexing system so that performance is not degraded even with the parasitic capacitances; and (2) the integrating capacitors allow each detector to be monitored for the time period set by the integration time period. However, this technique has at least two drawbacks: (1) many components are required which is costly; and (2) no monitoring of the detectors occurs during steps 2, 3, and 4, that is, while the charge is shifted and multiplexing occurs.

While the numerous components may not be a critical problem because modern technology can provide dense integration of a large number of semiconductor components, the time missed monitoring the detectors is significant. For example, if the integration period is short, for example 100 microseconds, and if the output data requires 1000 microseconds to multiplex and digitize, that is, 15 microseconds for each of the 64 signals, then the detectors are only being monitored for 10% of the time and during the other 90% of the time they are dormant.

U.S. Pat. No. 4,780,612 relates to another approach in which frequency multiplexing is used to separate the signals from each detector and allow a large number of devices to be monitored. Although this approach allows each resistive detector to be monitored continuously, each detector must have a separate oscillator and mixer. Accordingly, many components are required and the frequency multiplexing requires a fairly sophisticated signal processing system.

U.S. Pat. No. 5,185,519 discusses another approach, that is, an active switching system which multiplexes both one dimensional and two dimensional resistive arrays. This active switching approach requires few components and operates by switching the detector outputs from hard ground to virtual ground nodes thereby circumventing problems associated with parasitic capacitance. However, this approach does not allow for the signals output from the detectors to be integrated. Further, the signal from each detector is only monitored while the switches are configured to monitor that particular detector. Consequently, each detector is monitored for only a small fraction of the total array monitoring time; thus, for example, with a 64 element array, each detector is only monitored for 1/64th of the time.

SUMMARY OF THE INVENTION

An object of the present invention is to provide a multiplexing means and method which requires few components to monitor a large number of resistive detectors with little or no degradation in the signal to noise ratio. The subject invention accomplishes this object by assigning a single integrating capacitor to the output of each detector, allowing that capacitor to slowly charge. A switching network is then used to multiplex current, not voltage. This network actively accesses each detector/capacitor pair in order, moving all the charge accumulated on each capacitor to a single output capacitor, and converting each charge to an output voltage. Accordingly, each detector operates essentially all of the time, with all current accumulated and used to generate an output signal. Further, all parasitic capacitance problems are eliminated because all the multiplexor pins are tied to ground. In addition, accumulation by the resistive sensors and the multiplexing of the accumulated charge is carried out simultaneously.

Another object of the subject invention is to provide a sensor means having: (1) one or more detecting means to detect an event as a variable resistance; (2) one or more converting means for converting the variable resistance into charge; (3) one or more accumulating means to accumulate the charge over a time period; and (4) one or more transferring means to both transfer the accumulated charge and to reset the accumulating means. Such a sensor means may also include: a controlling means to control more than one transferring means; a storing means for storing the transferred accumulated charge; a resetting means to reset the storing means; and a converting means for converting the stored charge into a voltage. In addition, the controlling means may selectively connect, that is, share the converting means and the storing means with different transferring means.

An additional object of the subject invention is to provide a sensor having: (1) one or more resistive detectors; (2) a reference voltage connected to a first lead of each resistive detector; (3) an integrating capacitor connected to a second lead of a respective resistive detector; (4) one or more first switches, each having a first end connected to the second lead of a respective resistive detector; (5) a storage capacitor connected at one end to each second end of each first switch; (6) a second switch connected at one end to each second end of each first switch; (7) an operational amplifier having a negative input connected to each second end of each first switch and an output connected to the other end of the second switch and to the other end of the storage capacitor; and a logic circuit connected to each first switch and the second switch. In addition, the switches may be transistors or logic chips and the resistive detector may be an infrared detector.

A further object of the subject invention is to provide a multiplex sensor circuit having: (1) one or more resistive detectors; (2) a reference voltage; (3) a respective integrating capacitor for each resistive detector for accumulating charge that passes through that resistive detector; and (4) a respective switch for selectively transferring the charge on each integrating capacitor and for selectively discharging each integrating capacitor. In addition, a controller can be connected to each switch for causing the selective transfer and selective discharge by each switch to occur sequentially and can include one or more counters. Also, the multiplex sensor circuit can also include a clock connected to the controller; a clock output line for indicating when a resistive sensor is being accessed; an array start indicator line for indicating when a first resistive sensor of a series of resistive sensors is being accessed; an amplifier having a feedback capacitor to receive charge from each integrating capacitor and to convert the received charge into a voltage; and/or a switch in the feedback path of the amplifier to discharge the feedback capacitor between receptions of charge from different integrating capacitors.

A further object of the subject invention is to provide a method of sensing multiple events having the steps of: (1) detecting an event as a change in resistance in one or more detectors; (2) converting the resistance changes into charge; (3) accumulating the charge over a time period; and (4) transferring the accumulated charge at the end of the time period for further processing which resets the detector for another accumulation. The method may also include the steps of: storing the transferred charge; converting the transferred charge into a voltage; generating a clocking signal; and generating one or more output signals to indicate which sensors produced the charge being converted into the voltage.

DETAILED DESCRIPTION OF THE PREFERRED EMBODIMENTS

Figure 1:
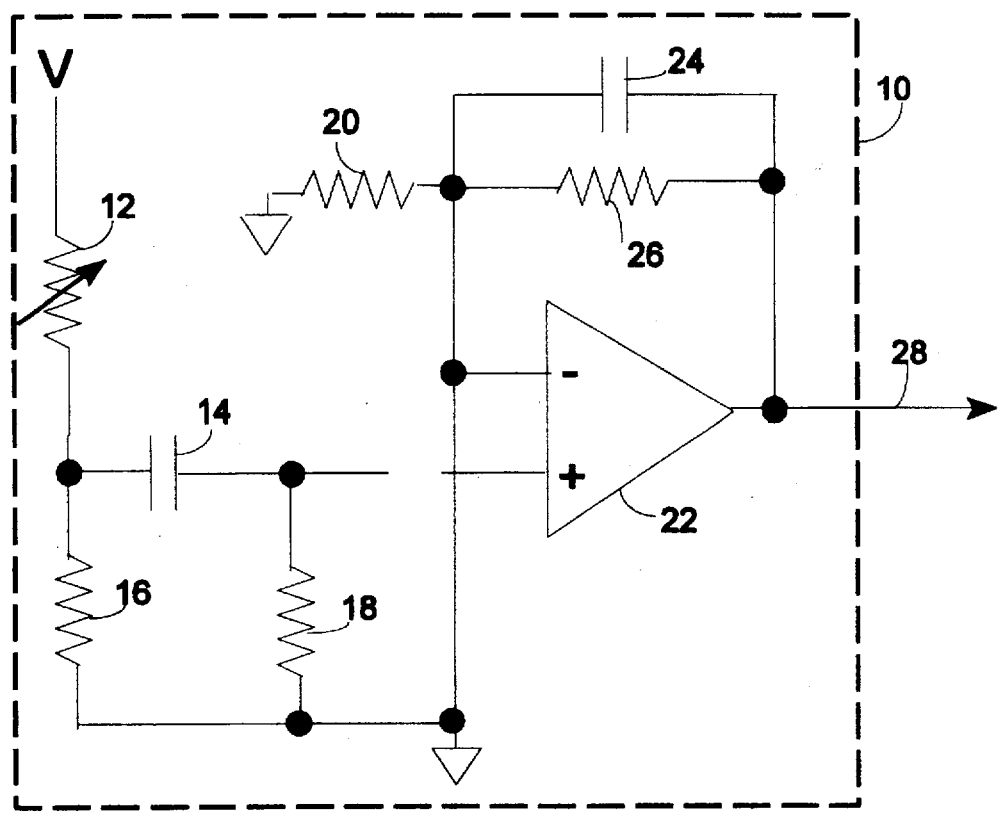
FIG. 1 illustrates a prior art circuit for a resistive sensor and the dedicated components for each such sensor including a resistive detector, four resistors, two capacitors and an operational amplifier.
Figure 2:
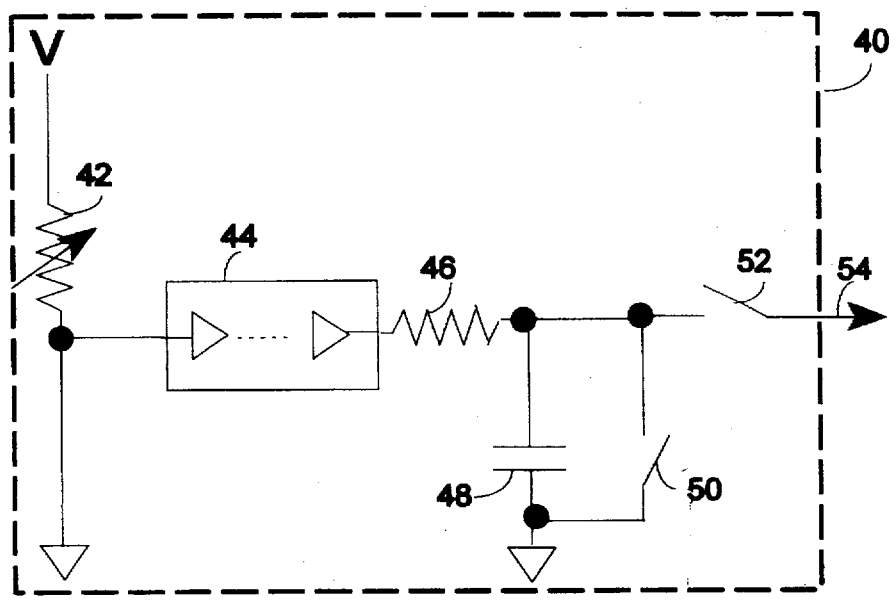
FIG. 2 illustrates another prior art circuit for a resistive sensor and the dedicated components for each such sensor including a resistive detector, at least two amplifiers, a resistor, a capacitor and two switches.
Figure 3:
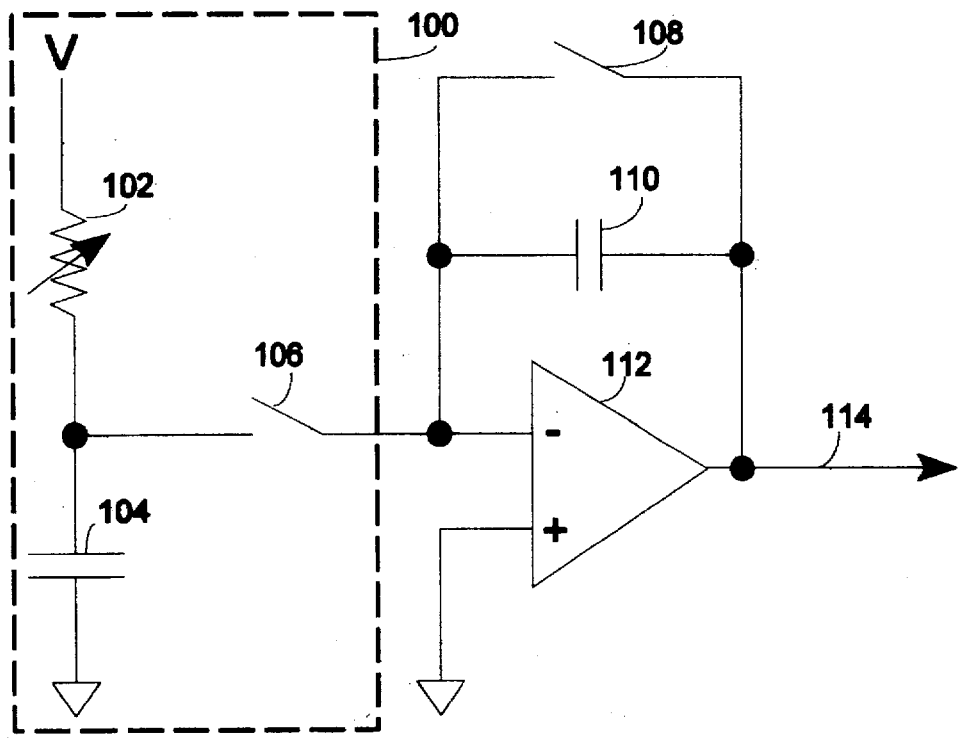
FIG. 3 is a circuit diagram of a single resistive sensor circuit connected to an accessing circuit according to one embodiment of the subject invention, that is, an infrared detector an integrating capacitor and a switch connected to a capacitor, a switch and an operational amplifier.
Figure 4:
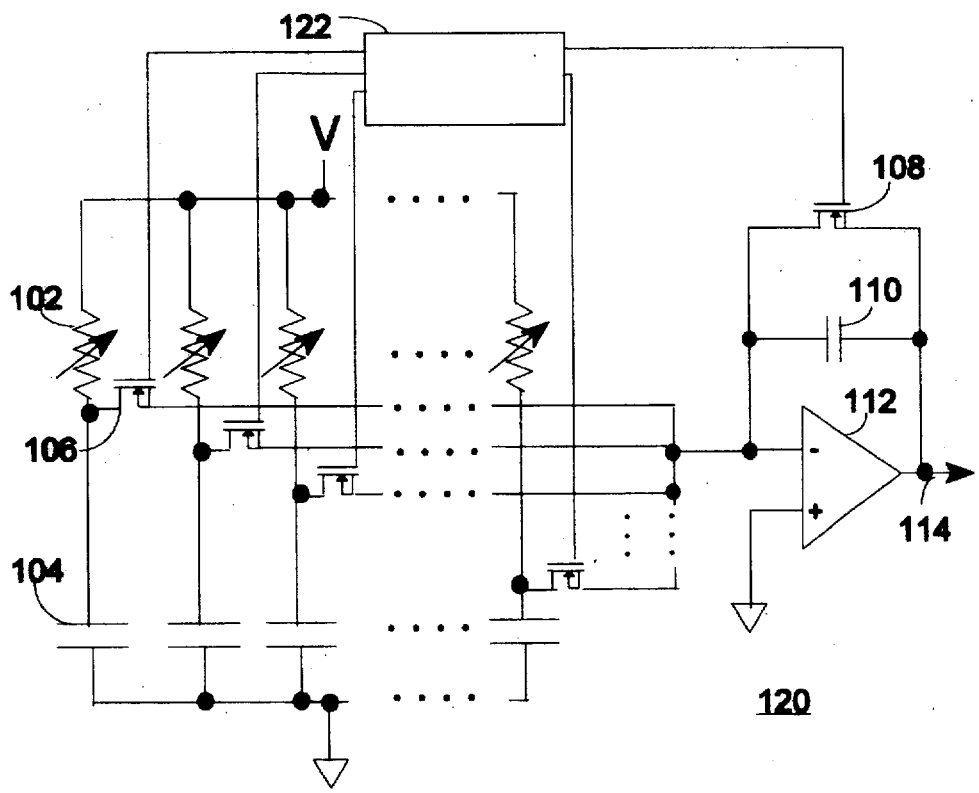
FIG. 4 is a circuit diagram showing an array of the resistive sensors connected, according to one embodiment of the subject invention, to a single accessing circuit.

FIGS. 3 and 4 illustrate one embodiment of a circuit for implementing the sensor multiplexing technique of the subject invention. Specifically, FIG. 3 shows a single element embodiment and FIG. 4 illustrates an embodiment having multiple sensors in an array 120. Each sensor circuit 100 has a reference voltage, V, placed on one lead of a resistive detector, 102. The other terminal of this detector 102 is attached to one lead of an integrating capacitor 104 and to a switch 106. The other lead of integrating capacitor 104 is connected to ground. Assuming the capacitor starts with no charge and switch 106 is open, current will flow across the resistive detector 102, causing the integrating capacitor 104 to steadily accumulate charge, that is, build up voltage. If left alone, the capacitor 104 would eventually fully charge and reach a voltage equal to V, at which time no further current would flow across the resistive detector 102. Long before this occurs, while the voltage on the integrating capacitor is still small, the switch 106 is engaged. This switch 106 is attached to the virtual ground input of an operational amplifier 112. The capacitor 104 is thus rapidly discharged, at a rate set by the resistance of the switch 106 and returns to a no charge state where it can again slowly accumulate charge from the resistive detector 102. Other current handling circuitry could be used in different embodiments envisioned by the subject invention.

While switch 106 is closed and current is flowing from the integrating capacitor 104 through the switch 106, the operational amplifier 112 is supplying a matching, canceling, current to the feedback capacitor 110 so that the negative input pin of the operational amplifier stays at ground. Consequently, if the integrating capacitor 104 and capacitor 108 have the same capacitance, the final charged voltage reached by the integrating capacitor now appears at the output of the operational amplifier 112. This voltage is held for a time period sufficient for an end user or external circuit to digitize or otherwise process the voltage, before the switch 108 is closed. This closure causes the feedback capacitor 110 to discharge, bringing the operational amplifier output back to ground, in preparation for accessing the next resistive sensor 100 in the array 120. As shown in FIG. 4, for the array 120, one lead of each switch 106 is connected to a respective resistive detector 102 and the other lead is connected to the negative input of operational amplifier 112.

Figure 5:
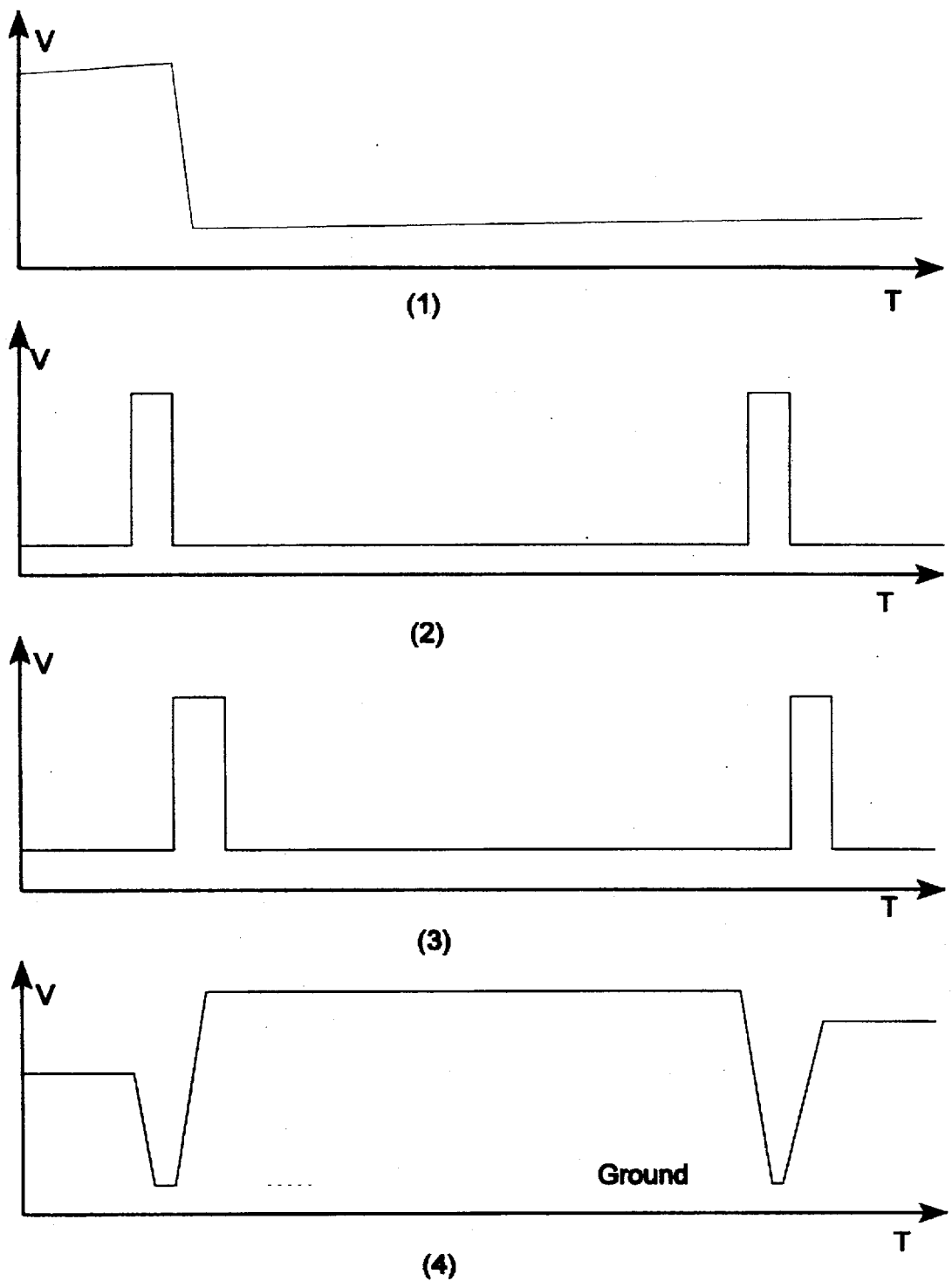
FIG. 5 is a group of timing diagrams illustrating the operation of one embodiment of the subject invention: (1) the first diagram shows the voltage over time for a single integrating capacitor; (2) the second diagram shows discharge pulses over time for closing the switch to discharge the amplifier's capacitor; (3) the third diagram shows the charge transfer pulses over time for closing the switch to connect the integrating capacitor to the accessing circuit; and (4) the fourth diagram shows the voltage output of the operational amplifier over time.

FIG. 5 shows four voltage versus time diagrams (traces) which are examples of various voltages that occur in one embodiment of the subject invention. The first (top) diagram in FIG. 5 illustrates the voltage across each integrating capacitor 104 as the voltage builds up over time. Before the charge on an integrating capacitor 104 can be transferred to the operational amplifier 112, a discharge pulse from a controller/multiplexor 122 closes switch 108, which as shown in FIG. 4, can be a field-effect transistor (FET). The discharge pulses are illustrated in the second (second from the top) diagram of FIG. 5. This closure causes feedback capacitor 110 to discharge and brings the output of the operational amplifier 112 to zero. The controller/multiplexor 122 then closes one of the switches 106, which can be a FET or an element of a multiplexor, to transfer the charge on a respective integrating capacitor 104 to the feedback capacitor 110. The voltage trace for this closure is illustrated in the third (third from top) diagram of FIG. 5. This process requires a short time period during which the voltage on the integrating capacitor 104 drops rapidly to ground and the amplifier output voltage ramps up rapidly. The selected switch 106 is then opened and the output voltage from the operational amplifier 112 remains constant until switch 108 is closed again, in preparation for the next element in the array. The output voltage of the operational amplifier 112 is shown by the fourth (bottom) diagram in FIG. 5 which is the amplifier output voltage trace.

Figure 6:
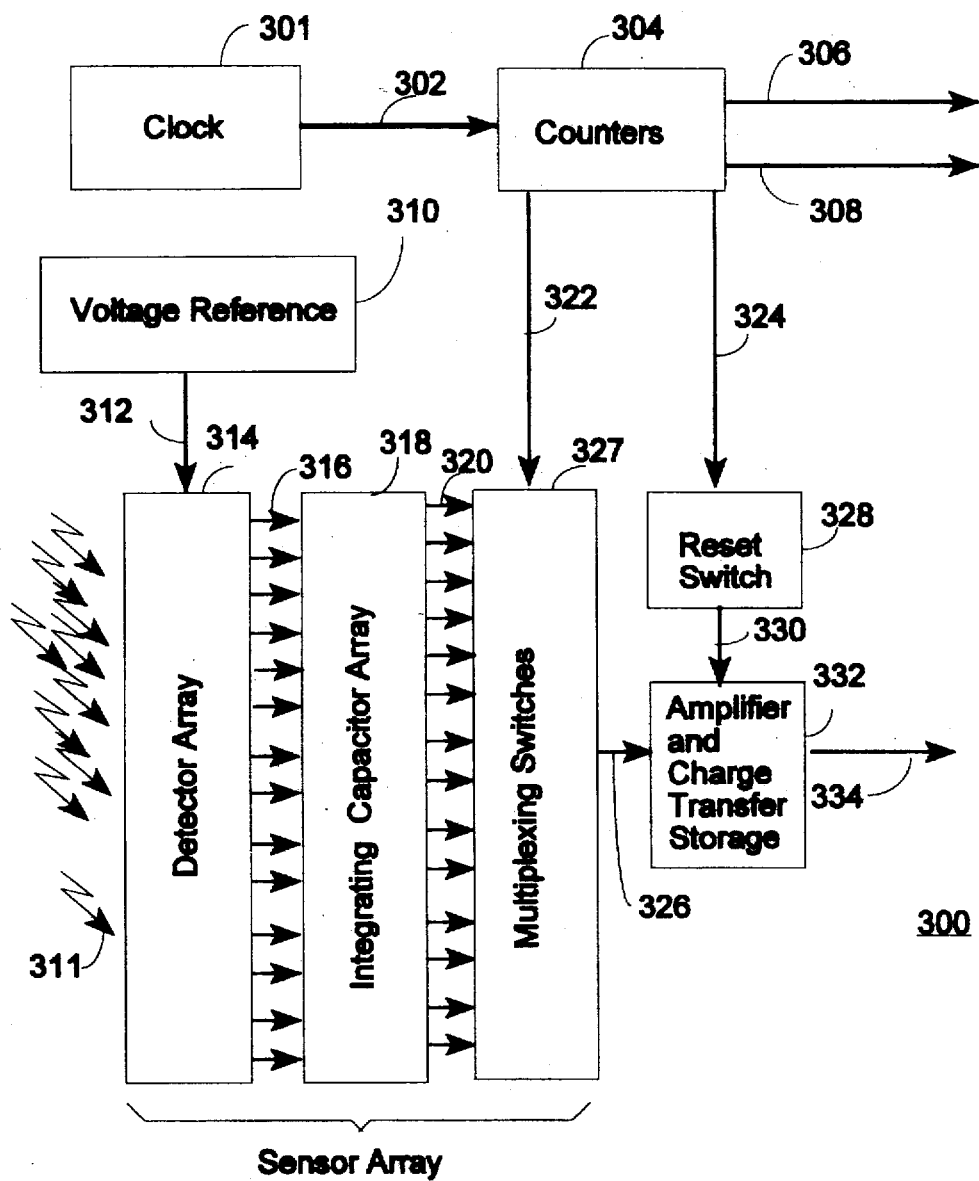
FIG. 6 is a block diagram of one embodiment of the subject invention illustrating the operation of a circuit including a clock, counters, a voltage reference, a sensor array, an integrating capacitor, multiplexing switches and an amplifier circuit which also stores charge.

FIG. 6 shows a block diagram of a complete multiplexing system 300 of one embodiment of the subject invention. A clock 301 is provided to govern timing of the multiplexing system 300, that is, the rate at which the resistive sensors 100 are read. The clock 301 provides a clocking signal on line 302 to counter circuitry 304 which can be digital logic chips. The counter circuitry 304 generates binary counting signals which are used to output at least four signals 306, 308, 322 and 324 required for multiplexing, that is, respectively: (1) a clock output signal; (2) an array start indicator signal; (3) one or more pulse train signals; and (4) a reset signal. The buffered clock output signal and the array start indicator signal are output so that external circuitry (not shown) can determine which element in the array 314 corresponds to the analog output voltage being read from line 334. The array start indicator signal pulses when a new pass through the array 314 begins and the clock output signal pulses once for each access of an array sensor element. In this way, by counting the clock output signal pulses from the array start indication, external circuitry can determine which sequential element in array 314 is being read at any time. The pulse train signals are received by the multiplexing switches 327 to select the particular element to read. In one embodiment, a separate pulse train is provided for each switch 106. Alternatively, a multiplexor logic chip having built-in switches and decoder can be used instead of discrete pulse train signals. The reset switch 328 pulses to discharge the stored charge in the feedback capacitor of the amplifier 332 after each sensor element 100 is accessed. As described above, a clean, preferably negative, voltage reference 310 is applied through line 312 across all of the resistive detectors 102 in the array 314, charging all of the integrating capacitors 318 at once through lines 316. As the multiplexing switches 322 are selectively engaged, each of the integrating capacitors 318 is discharged because the charge is allowed to flow through a respective line 320 and line 326 to the feedback capacitor 110 of the operational amplifier 112. The output from the operational amplifier 332 is supplied on line 334 as an output from the multiplexing system 300. Reset switch 328 creates the discharge pulse on line 330 to reset the operational amplifier 332 to prepare for reading the next resistive sensor 100 in the array. This process continues cyclically through all the elements of the array, in order, producing a serial output voltage indicative of the detector resistances, which vary according to the size and/or number of events detected. The clock 301 is set to operate quickly enough so that all the resistive sensors 100 of the array can be accessed before any one integrating capacitor 104 charges to more than a small voltage.

Resistive array 314 can be any size or configuration, but for a typically embodiment of the subject invention, the resistive array is linear array and has 64, 128 or 256 sensing elements; each element having a resistance between 0.8 megohms and 4.0 megaohms. Each of the capacitors in one embodiment of the subject invention has a capacitance of 0.1 microfarads. The operational amplifier 332 is selected to have a fast slew rate and to be able to receive FET inputs.

The circuitry described above allows continuous detector operation, that is, each resistive detector 102 in the array is biased by the reference voltage V at all times so that current flowing through each resistive detector 102 either goes to the integrating capacitor 104 when switch 106 is open, or to the feedback capacitor 110 when switch 106 is closed. Consequently, except for the tens of nanoseconds required for the switches 106 to open/close and resulting voltage spikes to decay, the current from each resistive detector 102 is continuously integrated by the respective sensor circuit 100, yielding a nearly ideal output voltage signal to noise ratio. This performance compares favorably to traditional sensor arrays, such as the Graseby example discussed in the Background section above, where 1000 microseconds are required to digitize the 64 output signals, that is, 15 microseconds for each detector, but only 100 microseconds are used to integrate the detector current. In contrast, the subject invention supplies the same 64 output signals during a 1000 microsecond period, but now the detectors can integrate for a full 1000 microseconds. Consequently, the signal to noise ratio of the output from the embodiments of the subject invention is more than a factor of three better than the Graseby system.

Although this invention was developed using two specific types of photoresistive sensors, specifically, lead sulfide and lead selenide, the invention is not limited to this type of detector. Indeed the circuitry and concepts presented are applicable to any situation where the resistance of a large number of resistive detectors needs to be monitored in a straightforward and optimal manner.

The above invention has been described in a specific embodiment, but a person skilled in the art could introduce many variations on this without departing from the spirit of the disclosure or from the scope of the appended claims. The embodiments are presented for the purpose of illustration only and should not be read as limiting the invention or its application. Therefore the claims should be interpreted commensurate with the spirit and scope of the invention. Thus, for example, this instrument could be modified to allow monitoring of several thermistors, instead of photoresistive detectors.

We claim:

1. A sensing means comprising:
   at least one means for detecting an event as a variable resistance;
   at least one means for converting the variable resistance into charge;
   at least one means for accumulating the charge over a time period; and
   at least one means for transferring the accumulated charge; the transferring means permitting further accumulating of charge while also resetting the accumulating means, thereby providing for continuous detection.

2. A sensing means according to claim 1 further comprising:
   means for controlling more than one of the transferring means.

3. A sensing means according to claim 1 further comprising:
   means for storing the transferred accumulated charge and further accumulating charge; and
   means for converting the stored charge into a voltage.

4. A sensing means according to claim 3 further comprising:
   means for controlling more than one of the transferring means such that the storing means and the converting means selectively connect to each of the transferring means.

5. A sensing means according to claim 4 further comprising
   means for resetting the storing means.

6. A sensing means according to claim 5 wherein:
   each detecting means is a resistive detector;
   each converting means for converting the variable resistance into charge is a reference voltage connected to a first lead of each resistive detector;
   each accumulating means is an integrating capacitor connected to a second lead of the respective resistive detector;
   each transferring means is a first switch having a first end connected to the second lead of the respective resistive detector;
   the storing means is a capacitor connected at one end to each second end of each first switch;
   the resetting means is a second switch connected at one end to each second end of each first switch;
   the converting means is an operational amplifier having a negative input connected to each second end of each first switch and an output connected to the other end of the second switch and to the other end of the storing capacitor; and
   the controlling means is a logic circuit connected to each first switch and the second switch.

7. A means for sensing according to claim 6 wherein:
   each first switch and the second switch are transistors.

8. A means for sensing according to claim 1 wherein:
   each means for detecting is an infrared sensor.

9. A multiplex sensor circuit comprising:
   one or more resistive detectors;
   a reference voltage;
   a respective integrating capacitor for each resistive detector for accumulating charge that passes through that resistive detector; and
   a respective switch for selectively transferring the charge on each integrating capacitor, for selectively discharging each integrating capacitor and for permitting further accumulating of charge that passes through the respective resistive detector.

10. A multiplex sensor circuit according to claim 9 further comprising:
    a controller connected to each switch for causing the selective transfer and selective discharge by each switch to occur sequentially.

11. A multiplex sensor circuit according to claim 10 wherein the controller comprises:
    one or more counters.

12. A multiplex sensor circuit according to claim 10 further comprising:
    a clock connected to the controller.

13. A multiplex sensor circuit according to claim 10 wherein the controller further comprises:
    an clock output line for indicating when a resistive sensor is being accessed; and
    an array start indicator line for indicating when a first resistive sensor of a series of resistive sensors is being accessed.

14. A multiplex sensor circuit according to claim 9 further comprising:
    an amplifier having a feedback capacitor to receive charge from each integrating capacitor and to convert the received charge into a voltage; and
    a switch in the feedback path of the amplifier to discharge the feedback capacitor between receptions of charge from different integrating capacitors.

15. A method of continuous sensing of events comprising the steps of:
    detecting an event as a change in resistance in one or more detectors;
    converting the resistance changes into charge;

accumulating the charge over a time period; and transferring the accumulated charge while further permitting accumulating of charge and resetting for new accumulation of charge.

16. A method according to claim 15 further comprising the steps of:

storing the transferred charge and the further accumulated charge; and converting the stored charge into a voltage.

17. A method according to claim 16 further comprising the steps of:

generating one or more output signals to indicate which sensors produced the charge being converted into the voltage.

18. A method according to claim 15 further comprising the step of:

generating a clocking signal.

* * * * *